United States Patent
Chang et al.

(10) Patent No.: US 7,911,742 B1
(45) Date of Patent: Mar. 22, 2011

(54) STAMPED ACTUATOR ARM HAVING LONGITUDINALLY SPACED-APART STAMPED PROTRUSIONS FOR SUPPORTING A TRACE SUSPENSION FLEX

(75) Inventors: Ken L. Chang, Saratoga, CA (US); John L. Rauen, Morgan Hill, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1591 days.

(21) Appl. No.: 10/633,145

(22) Filed: Jul. 31, 2003

(51) Int. Cl.
*G11B 5/54* (2006.01)

(52) U.S. Cl. .................................................. 360/264.2

(58) Field of Classification Search ............... 360/245.1, 360/245.9, 245.4, 245.3, 244.9; 720/637, 720/638

See application file for complete search history.

(56) References Cited

U.S. PATENT DOCUMENTS

| | | | |
|---|---|---|---|
| 5,656,877 A | 8/1997 | Loubier | |
| 5,901,016 A * | 5/1999 | Iwamoto | 360/245.9 |
| 5,953,183 A * | 9/1999 | Butler et al. | 360/264.2 |
| 5,966,269 A * | 10/1999 | Marek et al. | 360/244.3 |
| 5,991,123 A * | 11/1999 | Casey | 360/264.2 |
| 6,433,967 B1 * | 8/2002 | Arya | 360/244.8 |
| 6,636,383 B1 * | 10/2003 | Chew | 360/245.9 |
| 6,728,073 B1 * | 4/2004 | Budde et al. | 360/245.9 |
| 2002/0163763 A1 * | 11/2002 | Budde | 360/294.3 |
| 2004/0047078 A1 * | 3/2004 | Budde et al. | 360/245.9 |

* cited by examiner

Primary Examiner — Mark Blouin

(57) ABSTRACT

A novel head stack assembly is disclosed. The novel head stack assembly includes a stamped actuator arm and a head gimbal assembly attached to the stamped actuator arm. The head gimbal assembly includes a trace suspension flex having a metal base layer and a plurality of conductors supported by the metal base layer. The stamped actuator arm includes an actuator arm side surface that extends longitudinally along the stamped actuator arm. The stamped actuator arm also includes two or three longitudinally spaced-apart stamped protrusions. The stamped protrusions are in contact with the trace suspension flex, and each stamped protrusion extends from the actuator arm side surface.

9 Claims, 4 Drawing Sheets

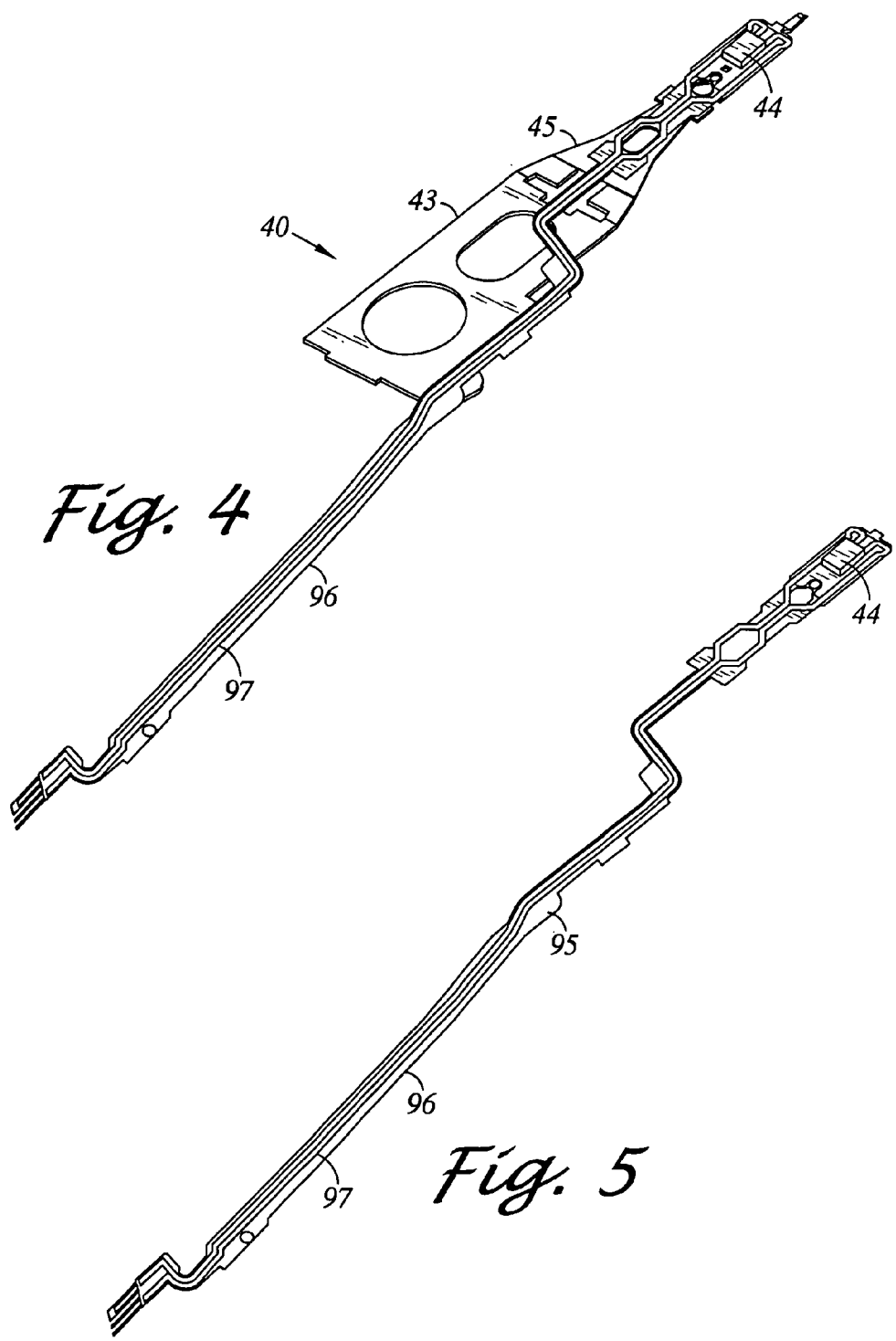

STAMPED ACTUATOR ARM HAVING LONGITUDINALLY SPACED-APART STAMPED PROTRUSIONS FOR SUPPORTING A TRACE SUSPENSION FLEX

BACKGROUND OF THE INVENTION

1. Field of the Invention

This invention relates to a head stack assembly for a disk drive. More particularly, this invention relates to a stamped actuator arm having a plurality of stamped protrusions for supporting a trace suspension flex.

2. Description of the Prior Art and Related Information

A huge market exists for disk drives such as hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 40 gigabytes per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main assemblies of a hard disk drive are a head disk assembly and a printed circuit board assembly.

The head disk assembly includes an enclosure including a disk drive base and a disk drive cover, at least one disk having at least one recording surface, a spindle motor for causing each disk to rotate, and an actuator arrangement. The printed circuit board assembly includes circuitry for processing signals and controlling operations. Actuator arrangements can be characterized as either linear or rotary; substantially every contemporary cost-competitive small form factor drive employs a rotary actuator arrangement.

The rotary actuator arrangement typically includes a head stack assembly having a rotary actuator. The rotary actuator includes an actuator body in which multiple actuator arms extend from the actuator body. A head gimbal assembly is attached to each respective actuator arm and such a head gimbal assembly may include a trace suspension flex for transmitting signals from a magnetic head to a preamplifier attached to a side of the actuator body via a flex assembly. The rotary actuator is typically formed from extruded metal, such as aluminum, and the metal actuator arm includes extruded tabs. Each extruded tab includes a slot, which is formed via a costly machining operation, and such machined slots are used to support the trace suspension flex.

SUMMARY OF THE INVENTION

A novel head stack assembly is disclosed. The novel head stack assembly includes a stamped actuator arm and a head gimbal assembly attached to the stamped actuator arm. The head gimbal assembly includes a trace suspension flex having a metal base layer and a plurality of conductors supported by the metal base layer. The stamped actuator arm includes an actuator arm side surface that extends longitudinally along the stamped actuator arm. The stamped actuator arm also includes two or three longitudinally spaced-apart stamped protrusions. The stamped protrusions are in contact with the trace suspension flex, and each stamped protrusion extends from the actuator arm side surface.

BRIEF DESCRIPTION OF THE DRAWINGS

FIG. 4 is a perspective view of a head gimbal assembly shown in FIG. 1;

FIG. 5 is a perspective view of a trace suspension flex shown in FIG. 4;

DETAILED DESCRIPTION

Figure 1:
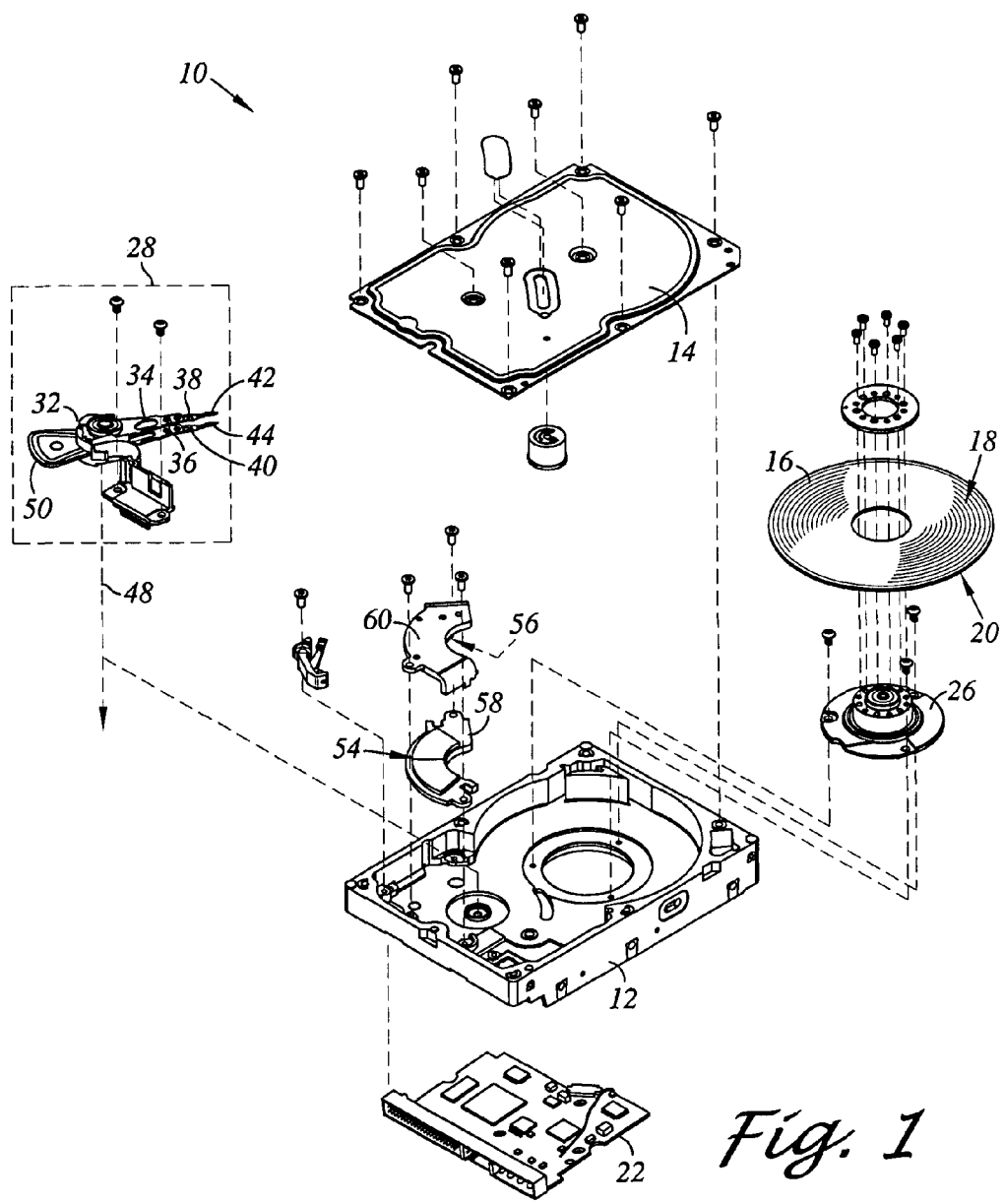
FIG. 1 is an exploded perspective view of a disk drive incorporating an embodiment of this invention.
Figure 2:
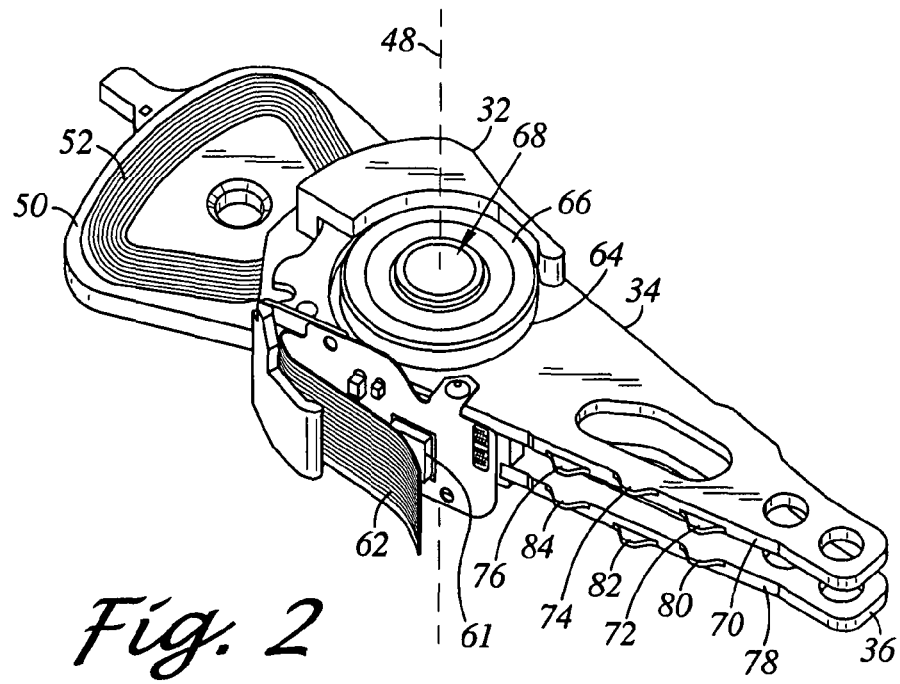
FIG. 2 is a perspective view of a portion of a head stack assembly shown in FIG. 1.
Figure 3:
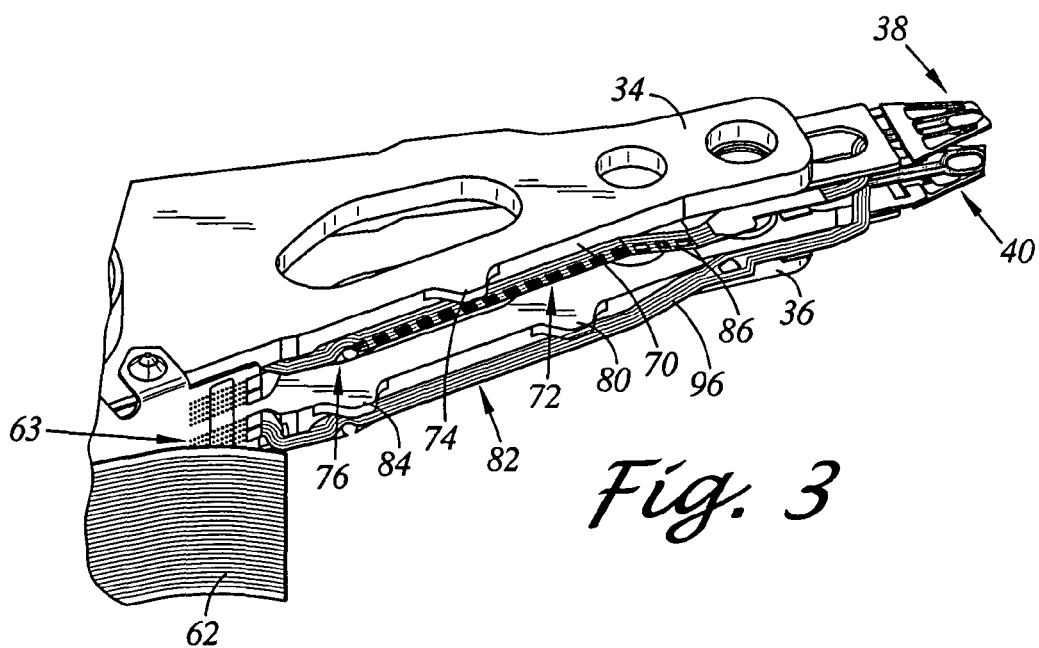
FIG. 3 is a perspective view of a portion of a head stack assembly shown in FIG. 1.

With reference to FIGS. 1-3, a disk drive 10 includes a disk drive base 12, a spindle motor 26 attached to disk drive base 12, a disk 16 supported on spindle motor 26, and a head stack assembly 28 rotatably coupled to disk drive base 12. Head stack assembly 28 includes a stamped actuator arm 36, a coil portion 50 attached to stamped actuator arm 36, a head gimbal assembly 40 attached to stamped actuator arm 36, head gimbal assembly 40 including a trace suspension flex 96 having a metal base layer 95 and a plurality of conductors 97 supported by metal base layer 95 (see FIG. 5). Stamped actuator arm 36 includes a bore 64 defining a pivot axis 48, an actuator arm side surface 78 extending longitudinally along stamped actuator arm 36, and a plurality of longitudinally spaced-apart stamped protrusions, e.g. stamped protrusions 80, 82, 84 as shown in one embodiment, for supporting trace suspension flex 96, each stamped protrusion extending from actuator arm side surface 78 in a direction generally perpendicular to pivot axis 48, the plurality of stamped protrusions being an integer in a range between 2 to 3. In one embodiment, each protrusion may be formed by first coining each protrusion feature from a stamped actuator arm and then forming the protrusion shape (see FIG. 2) via a stamping operation. In another embodiment, each stamped protrusion may be formed via a stamping operation without first subjecting a stamped actuator arm to a coining operation.

Continuing with FIG. 1, disk drive 10 further includes a disk drive cover 14, a printed circuit board assembly 22 attached to disk drive base 12, and a permanent magnet arrangement attached to disk drive base 12 which includes an upper voice coil motor ("VCM") plate 60 having a permanent magnet 56 attached to its inner surface and a lower VCM plate 58 having a permanent magnet 54. Disk 16 includes a first recording surface 18 and a second recording surface 20 opposite from first recording surface 18. Head stack assembly 28 includes a pair of stamped actuator arms 36, 34 and a plastic overmold 32, which secures coil portion 50 to the stamped actuator arms. As shown in FIG. 1, head gimbal assembly 40 is attached to stamped actuator arm 36 and includes a magnetic head 44 and a head gimbal assembly 38 is attached to stamped actuator arm 34 and includes a magnetic head 42. In the embodiment shown in FIG. 1, disk drive 10 includes a single disk, i.e., disk 16. However, in alternative embodiments, a plurality of disks, such as two or three disks, may be used in conjunction with corresponding head gimbal assemblies suitably attached to a given stamped actuator arm. For example, in an embodiment in which a disk drive includes two disks, four head gimbal assemblies may be used.

With reference to FIGS. 2-3, head stack assembly 28 further includes a coil 52 within coil portion 50, a pivot bearing cartridge 66 having a shaft 68, and a portion of a flex assembly 62 which includes a flex circuit cable suitably attached to one side of head stack assembly 28 as best shown in FIG. 2. Stamped actuator arm 34 includes an actuator arm side surface 70 and a plurality of longitudinally spaced-apart stamped protrusions 72, 74, 76, each stamped protrusion extending from actuator arm side surface 70 in a direction generally perpendicular to pivot axis 48. In the embodiment shown in FIGS. 2-3, each stamped actuator arm includes three stamped protrusions for supporting a given trace suspension flex and the stamped protrusions are generally equally spaced-apart longitudinally along a given actuator arm side surface as best shown in FIG. 2.

The structure shown in FIG. 2 may be suitably formed by disposing pivot bearing cartridge 66 within each bore 64 of each stamped actuator arm and then attaching coil 52 via an overmolding process which forms plastic overmold 32. Flex assembly 62 may then be suitably attached as shown in FIG. 2.

Continuing with FIG. 3, a head gimbal assembly, such as head gimbal assembly 40, only a portion of which is shown, is attached to a stamped actuator arm, such as stamped actuator arm 36. Head gimbal assembly 40 includes trace suspension flex 96, which is supported by stamped protrusions 80, 82, 84. Trace suspension flex 96 may be suitably attached to protrusions 80, 82, 84 via adhesive. Advantageously, each set of protrusions, such as protrusions 80, 82, 84, is aligned in a manner such that trace suspension flex 96 is lined up in a relative parallelism to stamped actuator arm 36; such an alignment allows for ease of bonding trace suspension signal pads formed on a distal end of trace suspension flex 96 to corresponding flex assembly signal pads on flex assembly 62, which facilitates high volume production of head stack assemblies. The distal end of trace suspension flex 96 is suitably attached, via a bonding process, to a portion of flex assembly 62 as generally denoted by 63 in FIG. 3. Such a configuration allows signals from a magnetic head to be passed to a preamplifier chip 61 (see FIG. 2) and vice versa, as is known in the art.

With reference to FIGS. 4-5, head gimbal assembly 40 includes a base plate 43, a load beam 45, and trace suspension flex 96. Trace suspension flex 96 includes magnetic head 44, metal base layer 95, and conductors 97 suitably embedded in a dielectric layer, such as a polyimide film. Conductors 97 may suitably take the form of conductive traces, e.g., copper traces, and metal base layer 95 may be formed from stainless steel. In one embodiment, magnetic head 44 may be a magneto-resistive head, such as a giant magneto-resistive ("GMR") head, in which case, conductors 97 include four conductive traces.

Figure 6:
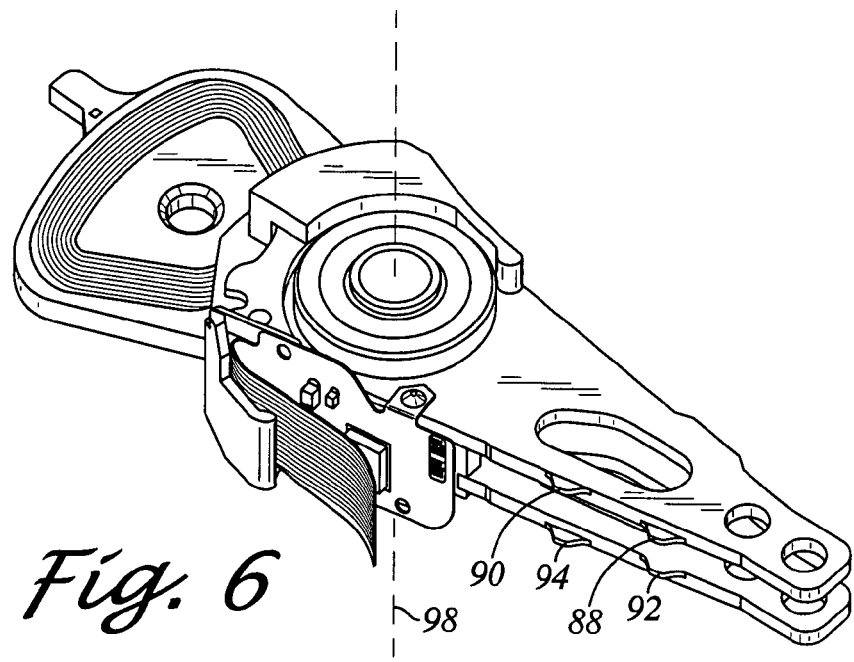
FIG. 6 is a perspective view of a portion of a head stack assembly in accordance with another embodiment of this invention.
Figure 7:
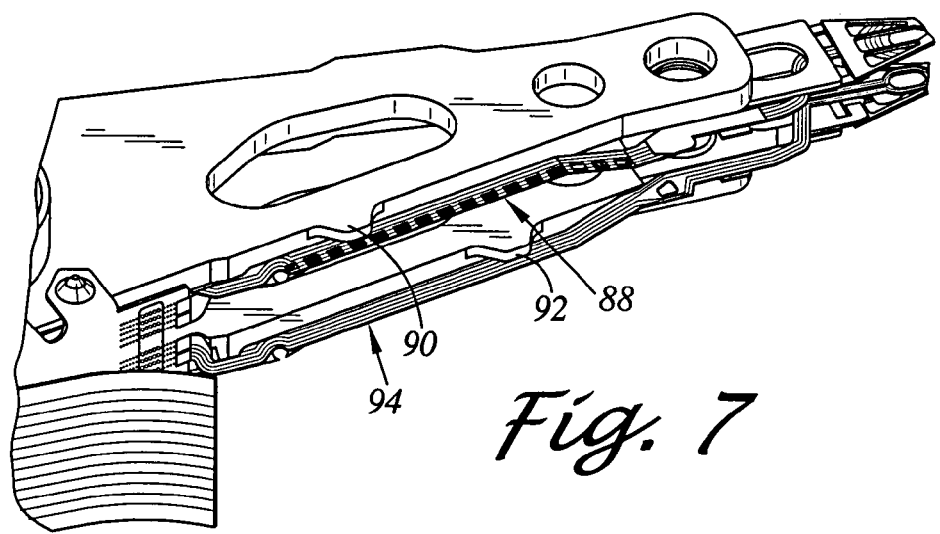
FIG. 7 is a perspective view of a portion of a head stack assembly in accordance with the embodiment shown in FIG. 6 in which a trace suspension flex is supported by a pair of stamped protrusions in each given actuator arm.

With reference to FIGS. 6-7, portions of a head stack assembly are shown in accordance with another embodiment of this invention. As shown, each stamped actuator arm includes two stamped protrusions for supporting a given trace suspension flex. For example, stamped protrusions 88, 90 are on one stamped actuator arm and stamped protrusions 92, 94 are on the other stamped actuator arm. Each stamped protrusion extend from a given actuator arm side surface in a direction generally perpendicular to a pivot axis 98.

What is claimed is:

1. A head stack assembly for a disk drive, comprising:
   a stamped actuator arm;
   a head gimbal assembly attached to the stamped actuator arm, the head gimbal assembly including a base plate, and a trace suspension flex having a metal base layer and a plurality of conductors supported by the metal base layer;
   the stamped actuator arm including:
   an actuator arm side surface extending longitudinally along the stamped actuator arm; and
   at least two but not more than three longitudinally spaced-apart stamped protrusions, the stamped protrusions being in contact with the trace suspension flex, each stamped protrusion extending from the actuator arm side surface.

2. The head stack assembly of claim 1, wherein the stamped actuator arm further includes a top surface extending longitudinally along the stamped actuator arm, and each stamped protrusion extends from the actuator arm side surface in a direction that is generally parallel to the top surface.

3. The head stack assembly of claim 1, wherein the trace suspension flex is attached to at least one of the stamped protrusions.

4. The head stack assembly of claim 1, wherein at least one of the stamped protrusions has a thickness that is substantially less than that of the stamped actuator arm.

5. A disk drive comprising:
   a disk drive base;
   a spindle motor attached to the disk drive base;
   a disk supported on the spindle motor;
   a head stack assembly rotatably coupled to the disk drive base;
   the head stack assembly including:
   a stamped actuator arm;
   a head gimbal assembly attached to the stamped actuator arm, the head gimbal assembly including a base plate, and a trace suspension flex having a metal base layer and a plurality of conductors supported by the metal base layer;
   the stamped actuator arm including:
   an actuator arm side surface extending longitudinally along the stamped actuator arm; and
   at least two but not more than three longitudinally spaced-apart stamped protrusions, the stamped protrusions being in contact with the trace suspension flex, each stamped protrusion extending from the actuator arm side surface.

6. The disk drive of claim 5, wherein the stamped actuator arm further includes a top surface extending longitudinally along the stamped actuator arm, and each stamped protrusion extends from the actuator arm side surface in a direction that is generally parallel to the top surface.

7. The disk drive of claim 5, wherein the trace suspension flex is attached to at least one of the stamped protrusions.

8. The disk drive of claim 5, wherein the integer is 3 and the stamped protrusions are generally equally spaced-apart longitudinally along the actuator arm side surface.

9. The disk drive of claim 5, wherein at least one of the stamped protrusions has a thickness that is substantially less than that of the stamped actuator arm.

* * * * *